United States Patent
Aphale et al.

(10) Patent No.: US 9,702,302 B2
(45) Date of Patent: Jul. 11, 2017

(54) METHODS AND SENSOR MODULE FOR CONTROLLING COMBUSTION EMISSION PARAMETERS IN A COMBUSTION SYSTEM

(71) Applicant: General Electric Company, Schenectady, NY (US)

(72) Inventors: Siddharth Aphale, Houston, TX (US); Nilesh Tralshawala, Rexford, NY (US); Aarron Dell Johansen, Greenville, SC (US)

(73) Assignee: General Electric Company, Schenectady, NY (US)

( * ) Notice: Subject to any disclaimer, the term of this patent is extended or adjusted under 35 U.S.C. 154(b) by 514 days.

(21) Appl. No.: 14/265,685

(22) Filed: Apr. 30, 2014

(65) Prior Publication Data

US 2015/0315992 A1 Nov. 5, 2015

(51) Int. Cl.
*F02C 9/00* (2006.01)
*F02D 41/14* (2006.01)
*F02C 9/50* (2006.01)

(52) U.S. Cl.
CPC .............. *F02C 9/00* (2013.01); *F02C 9/50* (2013.01); *F02D 41/1438* (2013.01); *F02D 41/1451* (2013.01); *F05D 2270/083* (2013.01); *F05D 2270/0831* (2013.01)

(58) Field of Classification Search
None
See application file for complete search history.

(56) References Cited

U.S. PATENT DOCUMENTS

| | | | |
|---|---|---|---|
| 7,492,980 B2 | 2/2009 | McCarthy et al. | |
| 8,149,407 B1 | 4/2012 | Rao | |
| 8,151,571 B2* | 4/2012 | Maly | F02C 9/28 60/39.5 |
| 8,265,851 B2 | 9/2012 | Girouard et al. | |
| 8,284,404 B2 | 10/2012 | Tuchman et al. | |
| 2010/0313572 A1* | 12/2010 | McManus | F02C 9/00 60/773 |
| 2011/0299084 A1* | 12/2011 | Feitisch | G01J 3/28 356/433 |

* cited by examiner

*Primary Examiner* — Pascal M Bui Pho
*Assistant Examiner* — Thuyhang Nguyen
(74) *Attorney, Agent, or Firm* — Armstrong Teasdale LLP

(57) ABSTRACT

Methods and a sensor module for use in controlling operation of a gas turbine system are provided herein. The sensor module is coupled within a combustion system and is configured to obtain an aspirated exhaust sample of exhaust flowing through an exhaust duct. The exhaust is generated by the combustion system. The aspirated exhaust sample is analyzed to determine a plurality of exhaust parameters. The sensor module also controls at least one combustion system parameter in a closed loop emission control (CLEC) system based on at least one of the plurality of exhaust parameters.

20 Claims, 2 Drawing Sheets

METHODS AND SENSOR MODULE FOR CONTROLLING COMBUSTION EMISSION PARAMETERS IN A COMBUSTION SYSTEM

BACKGROUND

The field of the disclosure described herein relates generally to monitoring gas turbine engine systems, and more specifically, to methods and systems for controlling combustion emission parameters in a combustion system.

Industrial gas turbines often require complex control systems for efficiently converting energy while minimizing polluting emissions. Pollutants such as nitrogen oxide may be reduced by lowering the maximum gas temperature, which may be achieved by maintaining a lean fuel-to-air ratio in the combustion chamber. However, if the fuel/air mixture is too lean, incomplete fuel combustion can produce excessive carbon monoxide and unburned hydrocarbons.

At least some known control systems attempt to control the fuel/air mixture by measuring various combustion parameters, and by using the measurements as input to control the fuel system. For example, one known control system receives fuel flow rates, pressure levels, and discharge exhaust temperature distributions as input for setting fuel trim control valves. The control system uses such data and attempts to optimize operation of the gas turbine assembly. However, the effectiveness of such systems may be limited by the effectiveness of the sensors and such control systems may require separate and redundant sensors for determining each parameter. As such, the benefits gained from such systems may be offset or limited by the cost and effectiveness of the sensors.

BRIEF DESCRIPTION

In one aspect, a method of controlling combustion emission parameters in a combustion system is provided. The method includes obtaining an aspirated exhaust sample of exhaust flowing through an exhaust duct. The exhaust is generated by the combustion system. The method also includes analyzing, by a sensor module, the aspirated exhaust sample to determine a plurality of exhaust parameters and controlling at least one combustion system parameter in a closed loop emission control (CLEC) system based on at least one of the plurality of exhaust parameters.

In another aspect, a sensor module for use in controlling operation of a gas turbine engine system is provided. The sensor module is coupled within a combustion system and is configured to obtain an aspirated exhaust sample of exhaust flowing through an exhaust duct. The exhaust is generated by the combustion system. The aspirated exhaust sample is analyzed to determine a plurality of exhaust parameters. The sensor module also controls at least one combustion system parameter in a closed loop emission control (CLEC) system based on at least one of the plurality of exhaust parameters.

In yet another aspect, a gas turbine engine system is provided that includes a combustion section configured to generate combustion gases that are directed towards a turbine section and a sensor module for operation of the gas turbine system. The sensor module coupled is within a combustion system and is configured to obtain an aspirated exhaust sample of exhaust flowing through an exhaust duct. The exhaust is generated by the combustion system. The aspirated exhaust sample is analyzed to determine a plurality of exhaust parameters. The sensor module also controls at least one combustion system parameter in a closed loop emission control (CLEC) system based on at least one of the plurality of exhaust parameters.

DRAWINGS

DETAILED DESCRIPTION

Figure 1:
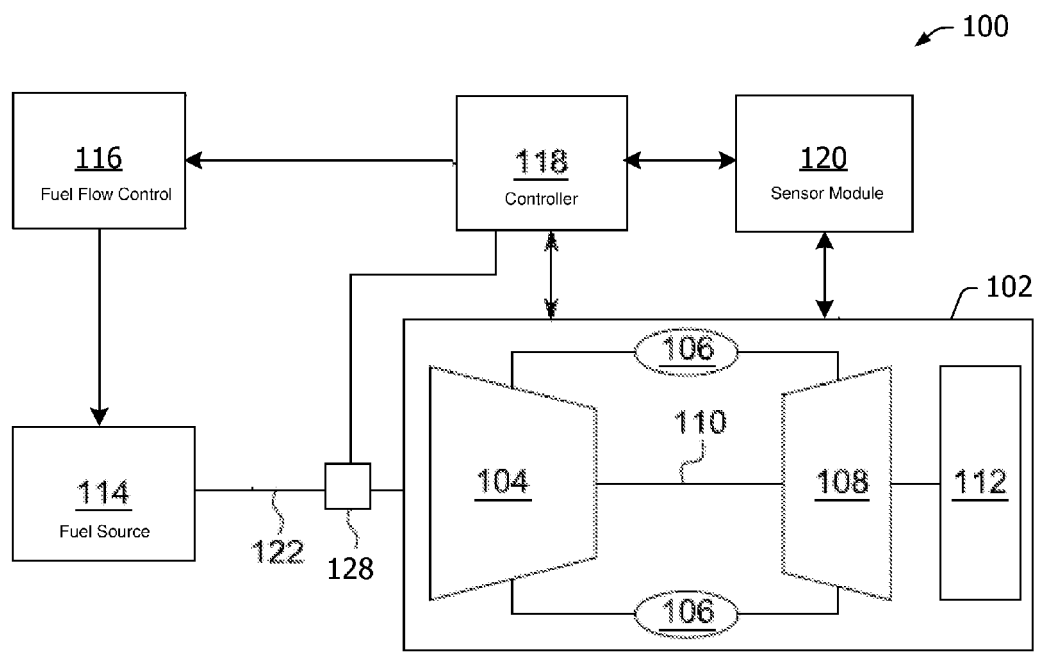
FIG. 1 is schematic diagram of an exemplary gas turbine engine system.

FIG. 1 is a schematic diagram of an exemplary gas turbine engine system 100. In the exemplary embodiment, gas turbine engine system 100 includes a gas turbine engine 102, a fuel source 114, a sensor module 120, and a controller 118. Fuel source 114 and gas turbine engine 102 are coupled in flow communication via a primary fuel line 122 that includes a fuel flow control 116. An air flow controller 128 controls an amount of air provided to be mixed with fuel from fuel source 114 to be provided to gas turbine engine 102. Controller 118 is coupled to sensor module 120, fuel flow control 116, and to gas turbine engine 102. Gas turbine engine 102 includes, coupled in serial flow arrangement, a compressor 104, at least one primary combustion system 106, and a turbine 108 that is rotatably coupled to compressor 104 via a shaft 110.

In the exemplary embodiment, ambient air is channeled into gas turbine engine 102 towards compressor 104, and fuel from fuel source 114 is channeled into gas turbine engine 102 toward primary combustion system 106. The ambient air is compressed by compressor 104 prior to being directed towards primary combustion system 106. In the exemplary embodiment, compressed air is mixed with the fuel, and the resulting fuel-air mixture is ignited within primary combustion system 106 to generate combustion gases that are directed towards turbine 108. Moreover, in the exemplary embodiment, turbine 108 extracts rotational energy from the combustion gases and rotates shaft 110 to drive compressor 104. Furthermore, in the exemplary embodiment, turbine assembly 100 drives a load 112, such as a generator, coupled to shaft 110. In the exemplary embodiment, load 112 is downstream of turbine assembly 100. Alternatively, load 112 may be upstream from turbine assembly 100.

Figure 2:
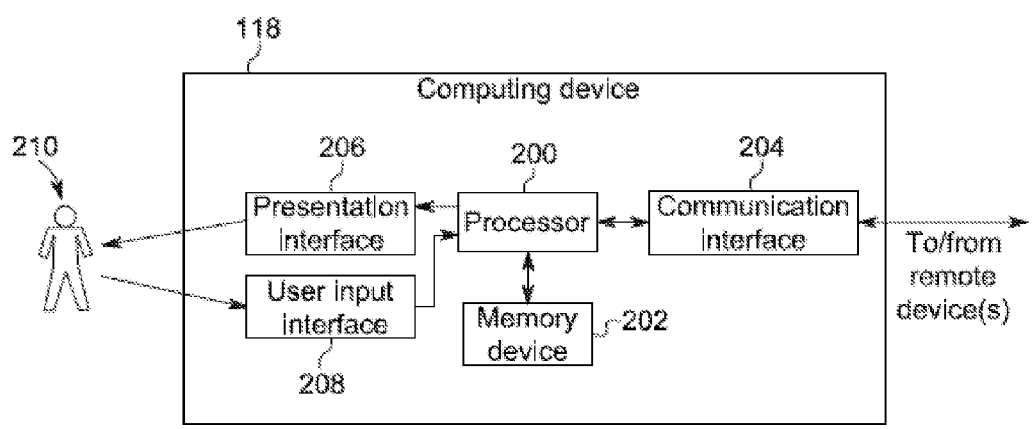
FIG. 2 is a block diagram of an exemplary computing device.

FIG. 2 is a block diagram of an exemplary computing device, or controller, 118 that may be used to analyze measurements received from sensor module 120 and to control the fuel supply to gas turbine engine 102. Controller 118 includes a memory device 202 and a processor 200 operatively coupled to memory device 202 for executing instructions. Processor 200 may include one or more processing units, e.g., without limitation, coupled in a multi-core configuration. In some embodiments, executable instructions are stored in memory device 202. Controller 118 is configurable to perform one or more operations described herein by programming processor 200. For example, processor 200 may be programmed by encoding an operation as one or more executable instructions and providing the executable instructions in memory device 202.

In the exemplary embodiment, memory device 202 is one or more devices that enable storage and retrieval of information such as executable instructions and/or other data. Memory device 202 may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program. Memory device 202 may be configured to store, without limitation, application source code, application object code, source code portions of interest, object code portions of interest, configuration data, execution events and/or any other type of data.

Memory device 202 may be configured to store operational measurements including, without limitation, real-time and historical reference flame temperatures, differential pressure measurements, oxygen concentration in a gas mixture, and/or any other type data. In some embodiments, processor 200 removes or "purges" data from memory device 202 based on the age of the data. For example, processor 200 may overwrite previously recorded and stored data associated with a subsequent time and/or event. In addition, or alternatively, processor 200 may remove data that exceeds a predetermined time interval. Also, memory device 202 includes, without limitation, sufficient data, algorithms, and commands to facilitate determination of various fuel properties and control of a fuel supply to gas turbine engine 102 as discussed further below.

In some embodiments, controller 118 includes a presentation interface 206 coupled to processor 200. Presentation interface 206 presents information, such as a user interface and/or an alarm, to a user 210. In one embodiment, presentation interface 206 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 206 includes one or more display devices.

In some embodiments, controller 118 includes a user input interface 208. In the exemplary embodiment, user input interface 208 is coupled to processor 200 and receives input from user 210. User input interface 208 may include, for example, a keyboard, a pointing device, a mouse, a stylus, a touch sensitive panel, e.g., without limitation, a touch pad or a touch screen, and/or an audio input interface, e.g., without limitation, a microphone. A single component, such as a touch screen, may function as both a display device of presentation interface 206 and user input interface 208.

A communication interface 204 is coupled to processor 200 and is configured to be coupled in communication with one or more other devices, such as a sensor or another controller 118, and to perform input and output operations with respect to such devices. For example, communication interface 204 may include, without limitation, a wired network adapter, a wireless network adapter, a mobile telecommunications adapter, a serial communication adapter, and/or a parallel communication adapter. Communication interface 204 may receive data from and/or transmit data to one or more remote devices. For example, a communication interface 204 of one controller 118 may transmit an alarm to the communication interface 204 of another controller 118.

Presentation interface 206 and/or communication interface 204 are both capable of providing information suitable for use with the methods described herein, e.g., to user 210 or another device. Accordingly, presentation interface 206 and communication interface 204 may be referred to as output devices. Similarly, user input interface 208 and communication interface 204 are capable of receiving information suitable for use with the methods described herein and may be referred to as input devices.

Figure 3:
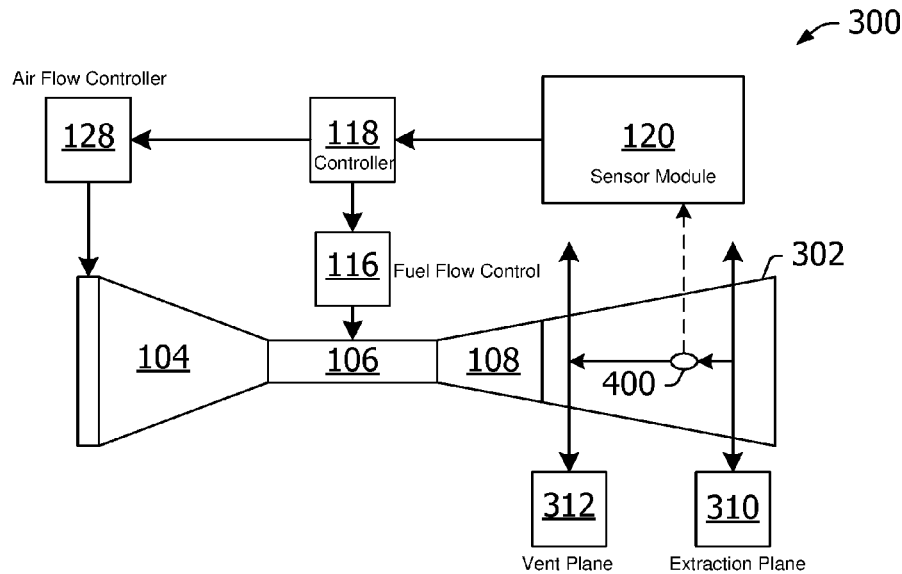
FIG. 3 is block diagram of an exemplary closed loop emission control (CLEC) system that may be used with the gas turbine engine system shown in FIG. 1.
Figure 4:
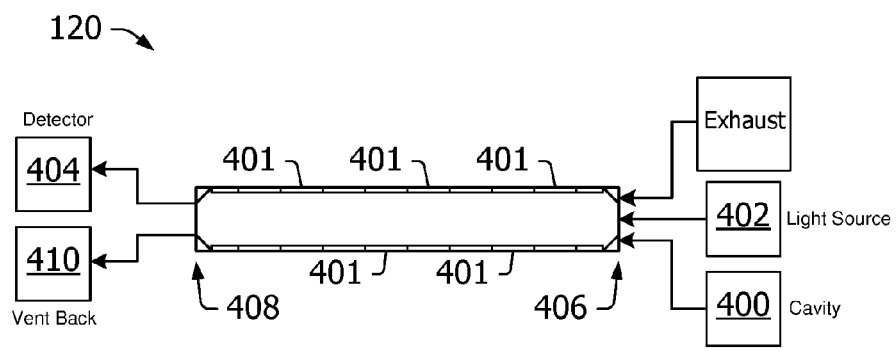
FIG. 4 is a block diagram of an exemplary sensor module that may be used with the CLEC system shown in FIG. 3.

FIG. 3 is block diagram of an exemplary closed loop emission control (CLEC) system 300 that may be used with gas turbine engine system 100 (shown in FIG. 1). FIG. 4 is a block diagram of an exemplary sensor module 120 that may be used with CLEC system 300 (shown in FIG. 3). In the exemplary embodiment, CLEC system 300 includes fuel flow control 116, controller 118, sensor module 120, and inlet air flow control 128 (all shown in FIG. 1).

In the exemplary embodiment, sensor module 120 is a tunable diode laser absorption spectroscopy (TDLAS) sensor module that is configured to measure a concentration of a specified emissions component within an exhaust sample. Sensor module 120 includes an exhaust gas extraction cavity 400 that is defined adjacent to a boundary of an exhaust duct 302, and at a location that is sufficiently distant from any vibration sources to avoid vibrational distortion of the laser signal in the fiber optic path. In one embodiment, cavity 400 is tubed into exhaust duct 302. Cavity 400 facilitates enhancing the travel of light through the exhaust sample. More specifically, in the exemplary embodiment, cavity 400 includes a plurality of mirrors 401 mounted therein that reflect the light within cavity 400.

In the exemplary embodiment, at least one light source 402 and at least one detector 404 are positioned adjacent to exhaust duct 302, at first end 406 and opposing second end 408 of cavity 400. In the exemplary embodiment, light source 402 is a tunable diode laser light source that is operatively coupled to controller 118. Tunable diode laser light source 402 is selectively adjustable to emit a light frequency that corresponds to a particular gas constituent. Additionally, light source 402 can be tuned to different frequencies to accommodate a range of gas constituents. Because tunable diode laser spectroscopy has this capability, the light may reflect a number of times through the exhaust sample within cavity 400.

In addition, extraction of the exhaust is based on a velocity of the exhaust. More specifically, as fluid is channeled further downstream within exhaust duct 302, the velocity decreases, causing pressure to increase. Cavity 400 is oriented such that first end 406 is downstream with respect to the fluid in exhaust duct 302 relative to second end 408. For example first end 406 is located along an extraction plane 310, and second end 408 is located along a vent plane 312. The pressure differential in exhaust 302 causes exhaust fluid to enter from first end 406 and flow toward second end 408. Based on the velocity difference between extraction plane 310 and vent plane 312, velocity of the aspirated exhaust flow through cavity 400 may be accurately determined, without requiring a vacuum for the sample to be extracted. Specifically, the aspirated exhaust sample is extracted based on the pressure differential formed by the positioning of first end 406 and second end 408 of cavity 400 relative to the exhaust flow. The pressure differential between extraction plane 310 and vent plane 312 is inversely proportional to the velocity of the exhaust flow. Sensor module 120 further includes an exhaust sample vent back 410 that channels the exhaust sample back into exhaust duct 302 after the sample has been analyzed.

Light from light source 402 interacts with exhaust within cavity 400. The portion of light interacting with the exhaust may undergo spectral attenuation due to specific wavelength absorption of the light by emission species present in the exhaust. Light that has interacted with the exhaust may be incident on detector 404, and the resulting detector signal may be utilized by controller 118 for closed-loop control of combustor parameters. For example, such combustor parameters may include, but are not limited to only including, air/fuel ratios, fuel distribution, mass flow fuel nozzle acoustic impedance, airflow distribution, combustor balance, and/or any number of variables associated with combustor 106. Controller 118 contains the logic required to analyze the measured data to determine a temperature of the exhaust and/or a composition of the sample.

The design details of the measurement system for interrogating the exhaust emission species may depend upon on the emission species of interest. In some embodiments, a single wavelength (narrow-band) laser or laser diode may be utilized as light source 402. The narrowband emission from the laser may be matched to an absorption band of an emission species of interest. For example, the laser output wavelength may be matched to particular emission species and measurable absorption wavelengths. By matching the wavelength of light source 402 to one or more of these absorption wavelengths, and by selecting a suitable optical detector 404, a ratio of input to output optical energy can be measured and correlated with the relative concentration of the emission species of interest.

The sensor module described herein enables simultaneously measuring a plurality of exhaust parameters of exhaust flowing through an exhaust duct of a gas turbine system. In the exemplary embodiment, an exhaust measurement and an exhaust temperature are simultaneously measured.

An exemplary technical effect of the methods, systems, and apparatus described herein includes at least one of: (a) obtaining an aspirated exhaust sample of exhaust flowing through an exhaust duct, wherein the exhaust is generated by the combustion system; (b) analyzing, by a sensor module, the aspirated exhaust sample to determine a plurality of exhaust parameters; and (c) controlling at least one combustion system parameter in a closed loop emission control (CLEC) system based on at least one of the plurality of exhaust parameters.

Exemplary embodiments of methods and a module for controlling combustion emission parameters in a combustion system of a gas turbine system are described above in detail. The methods and sensor module for controlling combustion emission parameters are not limited to the specific embodiments described herein, but rather, components of systems and/or steps of the methods may be utilized independently and separately from other components and/or steps described herein. Although the present discussion focuses on a sensor module for a gas turbine engine in an industrial environment, the present system is not limited to gas turbines, but is also applicable to other applications such as measurement of fuel quality in a jet engine or fuel composition measurement in a pipeline. For example, the methods may also be used in combination with other gas turbine systems applications employing gas fueled combustors, and are not limited to practice with only the gas turbine engine systems and methods as described herein. Furthermore, the principles and teachings set forth herein are applicable to gas turbine engines using a variety of combustible gas fuels such as, but not limited to, natural gas, LPG (Liquefied Petroleum Gas), LNG (liquefied natural gas), industrial process tail gas and other synthetic gases.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of controlling combustion emission parameters in a combustion system, said method comprising:
   aspirating an exhaust sample of combustion system exhaust flow from an exhaust duct system into a cavity coupled to the exhaust duct;
   positioning an inlet of the cavity along an extraction plane downstream with respect to the exhaust flow in the exhaust duct to an outlet of the cavity along a vent plane;
   analyzing the aspirated exhaust sample contained within the cavity to determine a plurality of exhaust parameters; and
   controlling at least one combustion system parameter in a closed loop emission control (CLEC) system based on at least one of the plurality of exhaust parameters.

2. The method of claim 1, wherein aspirating the exhaust sample further comprises:
   transmitting light through the cavity, wherein the light is transmitted by a tunable diode laser light source positioned adjacent a first end of the exhaust gas extraction cavity; and
   receiving the light via the exhaust gas extraction cavity by a light detector positioned adjacent a second end of the exhaust gas extraction cavity.

3. The method of claim 1, wherein aspirating the exhaust sample further comprises:
   aspirating the exhaust sample based on a pressure differential of the exhaust flow between the inlet and outlet of the cavity.

4. The method of claim 3, wherein the pressure differential is inversely proportional to a velocity of the exhaust flow.

5. The method of claim 2, wherein transmitting light through the cavity further comprises reflecting the light off of a plurality of mirrors included in the cavity to enhance light travel within the aspirated exhaust sample.

6. The method of claim 2, wherein analyzing the aspirated exhaust sample to determine the plurality of exhaust parameters comprises relating a transmitted frequency of the tunable diode laser light source to a concentration of a particular emission species of interest in an overall exhaust composition.

7. The method of claim 2, further comprising adjusting the tunable diode laser light source to emit a light frequency that corresponds to a particular emission species of interest.

8. The method of claim 1, wherein analyzing the aspirated exhaust sample to determine the plurality of exhaust parameters comprises measuring the aspirated exhaust sample to determine an exhaust temperature and an exhaust composition.

9. The method of claim 1, wherein analyzing the aspirated exhaust sample to determine the plurality of exhaust parameters comprises simultaneously measuring the aspirated exhaust sample to determine an exhaust temperature and an exhaust composition.

10. The method of claim 9, wherein controlling at least one combustion system parameter in the CLEC system further comprises inputting the determined exhaust composition as a sensor input to the CLEC system to optimize performance of the combustion system.

11. An apparatus for use in controlling operation of a gas turbine engine system comprising,
a sensor module coupled within a combustion system and configured to:
aspirate an exhaust sample of combustion system exhaust flow from an exhaust duct into a cavity coupled to the exhaust duct, wherein an inlet of the cavity along an extraction plane is located downstream with respect to the exhaust flow in the exhaust duct to an outlet of the cavity along a vent plane;
a controller coupled to the sensor module and configured to:
analyze the aspirated exhaust sample contained within the cavity to determine a plurality of exhaust parameters; and
control at least one combustion system parameter in a closed loop emission control (CLEC) system based on at least one of the plurality of exhaust parameters.

12. The sensor module of claim 11, wherein the cavity comprises a plurality of mirrors configured to reflect light to enhance light travel within the aspirated exhaust sample.

13. The sensor module of claim 12, further comprising:
a tunable diode laser light source positioned adjacent the inlet of the cavity, the tunable diode laser light source configured to transmit the light through the cavity; and
a light detector positioned adjacent the outlet of the cavity, the light detector configured to receive the light via the cavity.

14. The sensor module of claim 13, wherein the tunable diode laser light source is configured to emit a light frequency that corresponds to a particular emission species of interest.

15. The sensor module of claim 11, further configured to simultaneously analyze the aspirated exhaust sample to determine an exhaust temperature and an exhaust composition.

16. The sensor module of claim 11, further configured to input the determined exhaust composition as a sensor input to the CLEC system to optimize performance of the combustion system.

17. A gas turbine engine system comprising;
a combustion section configured to generate combustion gases that are directed towards a turbine section; and
a sensor module for operation of a gas turbine system, said sensor module coupled within a combustion system and configured to:
aspirate an exhaust sample of combustion system exhaust flow from an exhaust duct into a cavity coupled to the exhaust duct, wherein an inlet of the cavity along an extraction plane is located downstream with respect to the exhaust flow in the exhaust duct to an outlet of the cavity along a vent plane;
a controller coupled to the sensor module and configured to:
analyze the aspirated exhaust sample contained within the cavity to determine a plurality of exhaust parameters; and
control at least one combustion system parameter in a closed loop emission control (CLEC) system based on at least one of the plurality of exhaust parameters.

18. The gas turbine engine system of claim 17, wherein the cavity comprises a plurality of mirrors configured to reflect light to enhance light travel within the aspirated exhaust sample.

19. The gas turbine engine system of claim 17, further comprising:
a tunable diode laser light source positioned adjacent the inlet of the cavity, the tunable diode laser light source configured to transmit light through the cavity; and
a light detector positioned adjacent the outlet of the cavity, the light detector configured to receive the light via the cavity.

20. The turbine engine system of claim 17, wherein the sensor module is further configured to input the determined exhaust composition as a sensor input to the CLEC system to optimize performance of the combustion system.

* * * * *